US012616896B2

(12) United States Patent
Zhang

(10) Patent No.: US 12,616,896 B2
(45) Date of Patent: May 5, 2026

(54) GAME SCREEN DISPLAY METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Fuchun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 462 days.

(21) Appl. No.: 18/122,511

(22) Filed: Mar. 16, 2023

(65) Prior Publication Data

US 2023/0218994 A1 Jul. 13, 2023

Related U.S. Application Data

(63) Continuation of application No. PCT/CN2022/096793, filed on Jun. 2, 2022.

(30) Foreign Application Priority Data

Jul. 2, 2021 (CN) .......................... 202110753176.4

(51) Int. Cl.
*A63F 13/52* (2014.01)
*A63F 13/60* (2014.01)

(52) U.S. Cl.
CPC .............. *A63F 13/52* (2014.09); *A63F 13/60* (2014.09)

(58) Field of Classification Search
CPC ......... A63F 13/52; A63F 13/60; A63F 13/355
See application file for complete search history.

(56) References Cited

U.S. PATENT DOCUMENTS 6,781,598 B1 * 8/2004 Yamamoto .............. G06T 15/20
345/473
7,001,280 B2 * 2/2006 Kudo ...................... A63F 13/52
345/475

(Continued)

FOREIGN PATENT DOCUMENTS

CN 107016924 A 8/2017
CN 109091861 A 12/2018

(Continued)

OTHER PUBLICATIONS

Tencent Technology, ISR, PCT/CN2022/096793, Aug. 11, 2022, 2 pgs.

(Continued)

*Primary Examiner* — Chase E Leichliter
(74) *Attorney, Agent, or Firm* — Morgan, Lewis & Bockius LLP

(57) ABSTRACT

The present invention discloses a game screen display method and apparatus, a storage medium, and an electronic device. The method includes: acquiring a current first position of a target virtual character in a game; acquiring a first background image from a pre-rendered background image that corresponds to the first position and a first foreground image that corresponds to the first position, respectively; generating a first game screen corresponding to the first position according to the first background image and the first foreground image; and causing a display of the first game screen by a target client of the game.

20 Claims, 6 Drawing Sheets

(56)                    References Cited

U.S. PATENT DOCUMENTS

| | | | | |
|---|---|---|---|---|
| 9,751,005 | B1 * | 9/2017 | Dong | A63F 13/65 |
| 10,773,162 | B1 * | 9/2020 | Harris | H04L 65/762 |
| 2004/0222988 | A1 * | 11/2004 | Donnelly | A63F 13/10 |
| | | | | 345/419 |
| 2007/0037625 | A1 * | 2/2007 | Edwards | A63F 13/45 |
| | | | | 463/42 |
| 2009/0054140 | A1 * | 2/2009 | Beser | A63F 13/52 |
| | | | | 463/31 |
| 2011/0271018 | A1 * | 11/2011 | Ye | A63F 13/235 |
| | | | | 710/62 |
| 2011/0314093 | A1 * | 12/2011 | Sheu | G06F 3/14 |
| | | | | 709/203 |
| 2012/0086630 | A1 * | 4/2012 | Zhu | A63F 13/26 |
| | | | | 345/156 |
| 2014/0143676 | A1 * | 5/2014 | Tan | G06F 9/451 |
| | | | | 715/744 |
| 2014/0300612 | A1 * | 10/2014 | Li | A63F 13/79 |
| | | | | 345/473 |
| 2016/0054807 | A1 * | 2/2016 | Flagg | G06F 3/167 |
| | | | | 345/158 |
| 2016/0253067 | A1 * | 9/2016 | Webb | G06F 3/0482 |
| | | | | 463/31 |
| 2017/0072309 | A1 * | 3/2017 | Perry | A63F 13/77 |
| 2018/0311574 | A1 * | 11/2018 | Kawahara | G06F 3/04886 |
| 2019/0308104 | A1 * | 10/2019 | Nicolades | A63F 13/35 |
| 2021/0046382 | A1 * | 2/2021 | Wu | A63F 13/85 |
| 2021/0077904 | A1 * | 3/2021 | Yen | A63F 13/5255 |
| 2021/0176288 | A1 * | 6/2021 | Ahuja | G06T 15/20 |
| 2022/0096937 | A1 * | 3/2022 | Dorn | A63F 13/79 |
| 2023/0218994 | A1 * | 7/2023 | Zhang | A63F 13/52 |
| | | | | 463/31 |

FOREIGN PATENT DOCUMENTS

| | | |
|---|---|---|
| CN | 110503708 A | 11/2019 |
| CN | 111111190 A | 5/2020 |
| CN | 112164016 A | 1/2021 |
| CN | 112791399 A | 5/2021 |
| CN | 112891936 A | 6/2021 |
| CN | 113426112 A | 9/2021 |

OTHER PUBLICATIONS

Shigetaka Yasue, "Let's Create an Original Map Image Distribution Service", The Journal of Survey: Science and Technology of Geospatial Information, vol. 63, No. 9, Sep. 2013, 12 pgs., Retrieved from the Internet: https://ndlsearch.ndl.go.jp/books/R100000002-1000000013974-15618854.

Tencent Technology, WO, PCT/CN2022/096793, Aug. 11, 2022, 5 pgs.

Tencent Technology, IPRP, PCT/CN2022/096793, Dec. 14, 2023, 6 pgs.

* cited by examiner

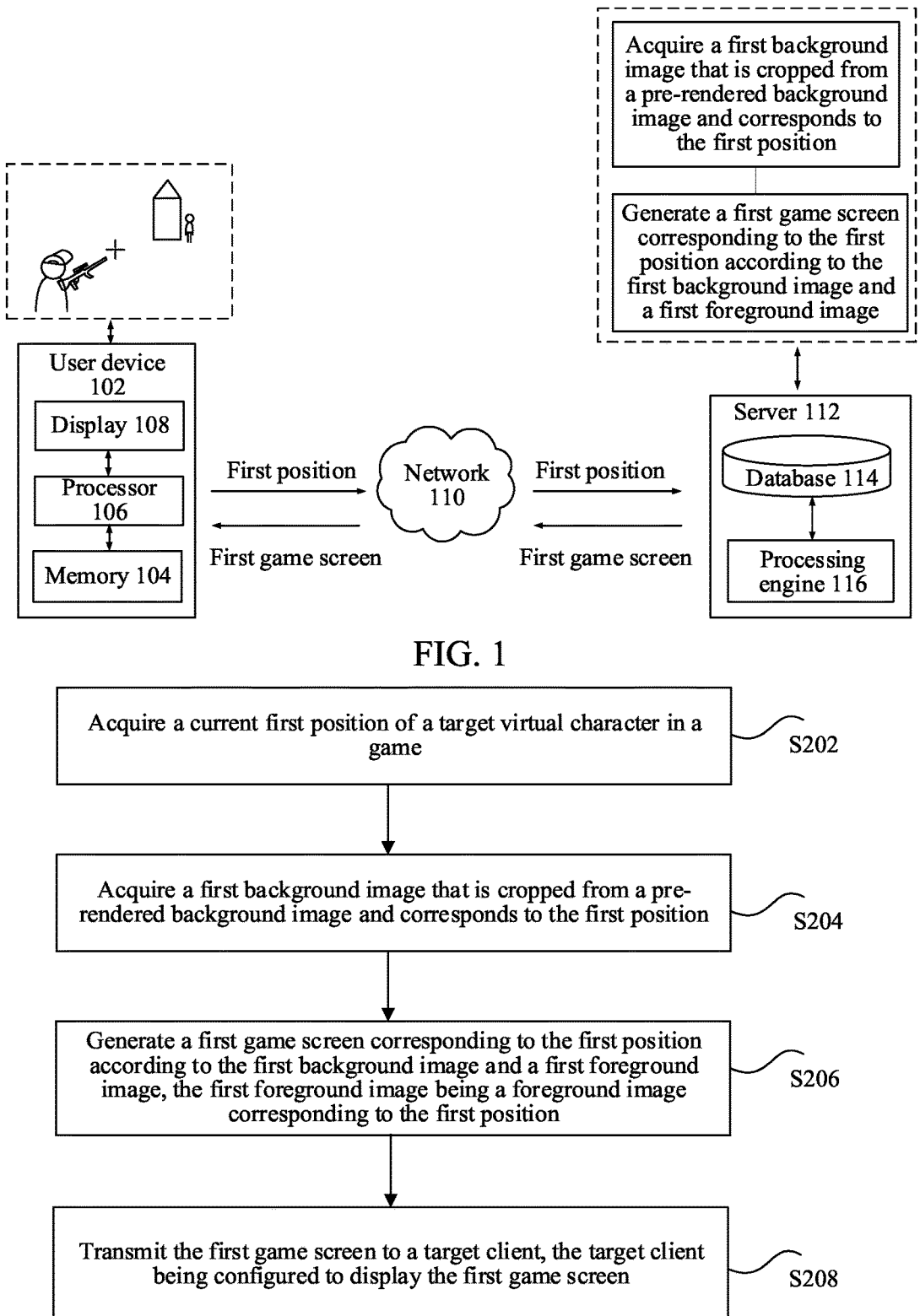

FIG. 1

Acquire a current first position of a target virtual character in a game — S202

Acquire a first background image that is cropped from a pre-rendered background image and corresponds to the first position — S204

Generate a first game screen corresponding to the first position according to the first background image and a first foreground image, the first foreground image being a foreground image corresponding to the first position — S206

Transmit the first game screen to a target client, the target client being configured to display the first game screen — S208

FIG. 2

GAME SCREEN DISPLAY METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2022/096793, entitled "GAME SCREEN DISPLAY METHOD AND APPARATUS, STORAGE MEDIUM, AND ELECTRONIC DEVICE" filed on Jun. 2, 2022, which claims priority to Chinese Patent Application No. 202110753176.4, entitled "GAME SCREEN DISPLAY METHOD AND APPARATUS, STORAGE MEDIUM, AND ELECTRONIC DEVICE" and filed with the National Intellectual Property Administration, PRC on Jul. 2, 2021, all of which is incorporated herein by reference in its entirety.

FIELD OF THE TECHNOLOGY

The present invention relates to the field of computers, and specifically, to a game screen display method and apparatus, a storage medium, and an electronic device.

BACKGROUND OF THE DISCLOSURE

Rendering a game scene usually is selecting an angle of a camera in a three-dimensional space, and then rendering the game scene according to a camera position.

In the related art, the rendering of game scenes does not distinguish between foreground and background. It takes a long rendering time to rotate the camera position to a certain angle and then render a game screen at the corresponding angle, resulting in a large delay. For a game scene requiring extremely low latency, game experience of a player is reduced.

SUMMARY

An embodiment of the present invention provides a game screen display method, including: acquiring a current first position of a target virtual character in a game; acquiring a first background image from a pre-rendered background image that corresponds to the first position and a first foreground image that corresponds to the first position, respectively; generating a first game screen corresponding to the first position according to the first background image and the first foreground image; and causing a display of the first game screen by a target client of the game.

An embodiment of the present invention further provides a game screen display apparatus, including: a first acquisition module, configured to acquire a current first position of a target virtual character in a game; a second acquisition module, configured to acquire a first background image from a pre-rendered background image that corresponds to the first position and a first foreground image that corresponds to the first position, respectively; a generation module, configured to generate a first game screen corresponding to the first position according to the first background image and the first foreground image; and a transmission module, configured to transmit the first game screen to a target client of the game at a terminal device, the target client being configured to display the first game screen when playing the game.

An embodiment of the present invention further provides a non-transitory computer-readable storage medium, the computer-readable storage medium storing a computer program, and the computer program, when executed by a processor of a computing device, causing the computing device to perform the foregoing game screen display method.

An embodiment of the present invention further provides a computing device, including a memory and a processor, the memory storing a computer program that, when executed by the processor, causes the computing device to perform the foregoing game screen display method.

BRIEF DESCRIPTION OF THE DRAWINGS

The accompanying drawings described herein are intended to provide further understanding of the present invention and constitute a part of this application. Exemplary embodiments of the present invention and the description thereof are used for explaining the present invention rather than constituting the improper limitation to the present invention. In the accompanying drawings:

FIG. 1 is a schematic diagram of an application environment of a game screen display method according to an embodiment of the present invention.

FIG. 2 is a flowchart of a game screen display method according to an embodiment of the present invention.

DESCRIPTION OF EMBODIMENTS

Figure 3:
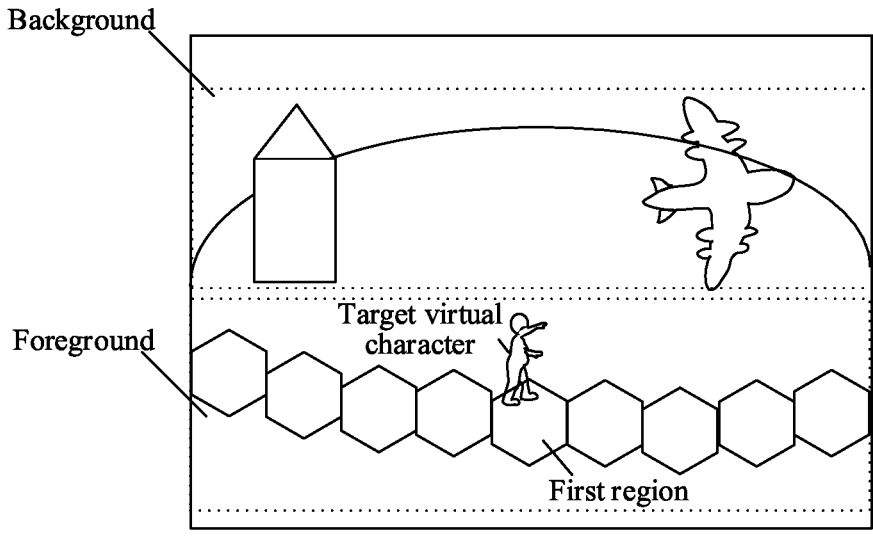
FIG. 3 is a schematic diagram 1 of a game screen according to an embodiment of the present invention.

To make a person skilled in the art better understand solutions of the present invention, the technical solutions in the embodiments of the present invention are clearly and completely described below with reference to the accompanying drawings in the embodiments of the present invention. Apparently, the described embodiments are merely some rather than all of the embodiments of the present invention. Based on the embodiments of the present invention, all other embodiments obtained by a person of ordinary skill in the art without creative efforts shall fall within the protection scope of the present invention.

It should be noted that the terms "first" and "second" in the description and claims of the present invention and the foregoing accompanying drawings are used to distinguish between similar objects, but are not necessarily used to describe a specific order or sequence. It should be understood that the data used in such a way may be interchanged in an appropriate condition, so that the embodiments of the present invention described herein can be implemented in an order other than those illustrated or described herein. In addition, the terms "comprise", "include", and any other variants thereof mean to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In the related art, it needs a long rendering time in rendering a game screen, resulting in a large delay. The embodiments of the present invention provide a game screen display method and apparatus, a storage medium, and an electronic device, to resolve at least the technical problem of the large delay in rendering the game screen.

An embodiment of the present invention provides a game screen display method. In some embodiments, the game screen display method may be applied to, but is not limited to, an application environment shown in FIG. 1. The application environment includes a user device 102, a network 110, and a server 112.

In some embodiments, the user device 102 may be a terminal device configured with an application client, and may include, but is not limited to at least one of the following: a mobile phone (for example, an Android phone or an iOS phone), a notebook computer, a tablet computer, a palmtop computer, a mobile Internet device (MID), a PAD, a desktop computer, a smart TV, and the like. The application client may be a game client, a video client, an instant messaging client, a browser client, an education client, or the like. The user device 102 includes a memory 104, a processor 106, and a display 108. The memory 104 is configured to store data, including but not limited to, game screen data, the processor 106 is configured to process data, including but not limited to, game data in the application client, and the display 108 is configured to display a game screen.

In some embodiments, the network 110 may include, but is not limited to, a wired network and a wireless network. The wired network includes: a local area network, a metropolitan area network, and a wide area network. The wireless network includes: Bluetooth, WiFi, and other networks that achieve wireless communication.

The server 112 may be a single server or a server cluster that includes a plurality of servers, or a cloud server. The server 112 includes a database 114 and a processing engine 116. The database 114 configured to store data, including but not limited to, the first background image and the first foreground image, and the processing engine 116 is configured to process the game data, including but not limited to, generate a first game screen corresponding to the first background image and the first foreground image, and transmit the first game screen to the application client.

The foregoing description is merely an example, and this is not limited in this embodiment.

FIG. 2 is a flowchart of a game screen display method according to an embodiment of the present invention. As shown in FIG. 2, the game screen display method is performed by a server, and includes:

Step S202. Acquire a current first position of a target virtual character in a game.

The target virtual character may be a character controlled in a game scene. FIG. 3 is a schematic diagram 1 of a game screen according to an embodiment of the present invention, where a current position of the target virtual character is a first position.

Step S204. Acquire a first background image that is, e.g., cropped from a pre-rendered background image and corresponds to the first position.

Figure 4:
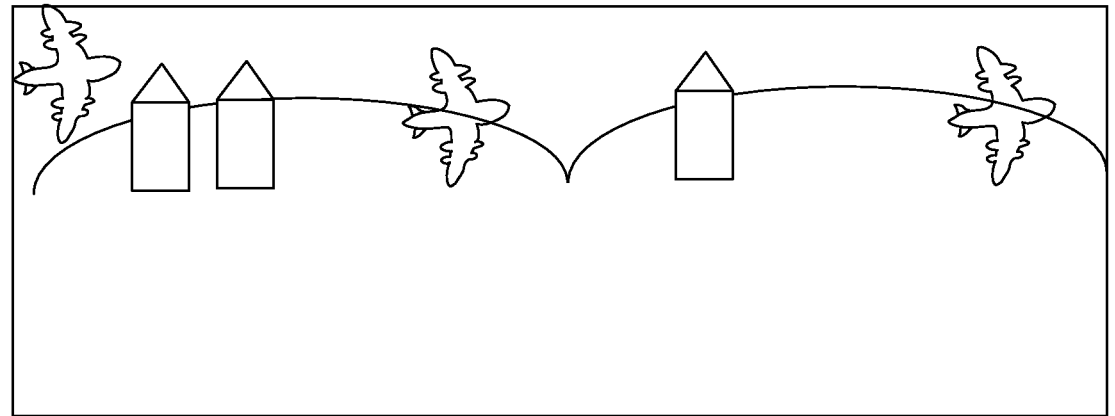
FIG. 4 is a schematic diagram of a target background image according to an embodiment of the present invention.

The background shown in FIG. 3 is a first cropped background image, and the first background image is cropped from a pre-rendered target background image. FIG. 4 is a schematic diagram of a background image according to an embodiment of the present invention. The background image is a background image obtained by pre-rendering the background of a big map of the game, and may also be referred to as a target background image.

Step S206. Generate a first game screen corresponding to the first position according to the first background image and a first foreground image, the first foreground image being a foreground image corresponding to the first position. In some embodiments, the first foreground image is rendered in real time The foreground shown in FIG. 3 is a first foreground image, which may be rendered according to the current first position of the target virtual character. The first foreground image may be rendered when the first background image is cropped or the first foreground image may be rendered when the first background image is acquired. The rendered first background image and first foreground image are superimposed to generate a first game screen shown in FIG. 3.

Step S208. Cause the display of the first game screen by a target client of the game, e.g., transmit the first game screen to the target client at a terminal device, the target client being configured to display the first game screen when playing the game.

The target client may be a game client, and the server may transmit the first game screen to a game client installed on the user device, so that the user device displays the first game screen in a display interface of the game client.

In the foregoing steps, the foreground and the background in the game scene are rendered separately, and the background is pre-rendered, so that a time for rendering the background is saved, which reduces the delay and ensures the image quality of the game scene. The game screen is generated according to the foreground and the pre-rendered background, and is displayed in a client, which can complete switching of the game screen in the client in a very short time and improve the user experience. Therefore, the technical problem of a large delay in rendering the game screen is resolved.

In some embodiments, the acquiring a first background image that is cropped from a pre-rendered background image and corresponds to the first position includes: acquiring, when it is determined that the first position is in a first region of a game map of the game, the first background image that is cropped from the pre-rendered background image and corresponds to the first region, where the game map includes a set of regions, and each of the set of regions corresponds to one background image cropped from the pre-rendered background image.

In some embodiments, the big map of the game may be divided into a plurality of regions, the background is unchanged when a virtual character moves in the same region, and the first region is one of the plurality of regions. The target background image is a background image obtained by pre-rendering a background of the big map of the game, and each region in the big map of the game corresponds to one background image cropped from a pre-rendered target background image. The first background image corresponding to the first region is cropped from the pre-rendered target background image shown in FIG. 4.

In some embodiments, the method further includes: acquiring, when the target virtual character moves from the first position in the first region to a second position in a second region, a second background image that is cropped from the pre-rendered target background image and corresponds to the second region; generating a second game screen corresponding to the second position according to the second background image and a second foreground image, where the second foreground image is a foreground image corresponding to the second position; and transmitting the second game screen to the target client, where the target client is configured to display the second game screen.

In some embodiments, when moving on the game map, the target virtual character may be considered to be in individual "regions". When the target virtual character is in a region, the target virtual character corresponds to one background image, and when the target virtual character moves to another region, the background image changes to some extent. In a cloud gaming environment, through the strong computing power and storage capability of the cloud, target background images corresponding to all regions on the game map are pre-rendered, and background image corresponding to each region may be cropped from the target background images, thereby achieving effects of saving the rendering time of the background image and reducing the delay.

Figure 5:
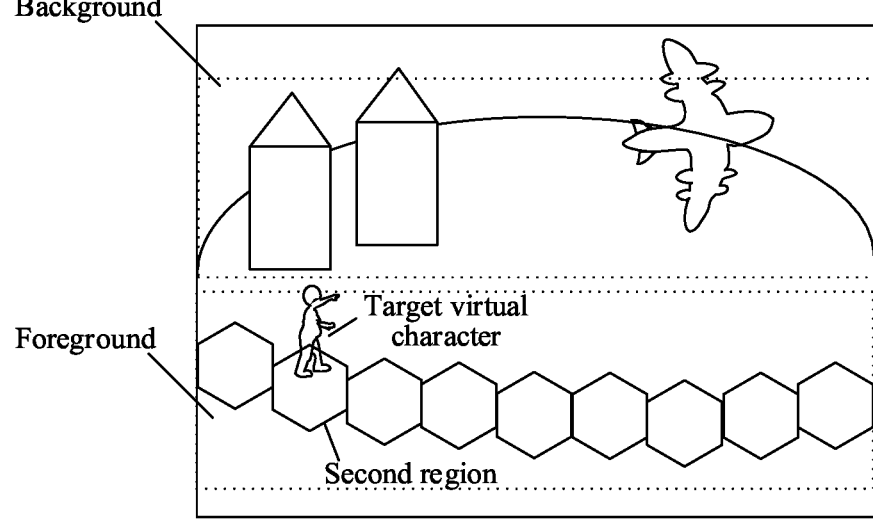
FIG. 5 is a schematic diagram 2 of a game screen according to an embodiment of the present invention.

In some embodiments, the first region and the second region are different regions in the big map of the game, the first position may be any position in the first region, and the second position may be any position in the second region. Because the background images corresponding to all regions on the game map are pre-rendered, the background image corresponding to each region may be cropped from the pre-rendered target background image. For example, FIG. 5 is a schematic diagram 2 of a game screen according to an embodiment of the present invention. The target virtual character moves from the first position in the first region shown in FIG. 3 to the second position in the second region shown in FIG. 5, and a second background image corresponding to the second region is cropped from the pre-rendered target background image shown in FIG. 4. During cropping the second background image, or during acquiring the second background image, the foreground shown in FIG. 5 is rendered to obtain a second foreground image. The cropped second background image and the second foreground image are superimposed to obtain a second game screen shown in FIG. 5. The second game screen may be transmitted by the server to the game client installed on the user device to display the second game screen in the display interface of the game client. In this embodiment, the foreground image is rendered in the server, and the foreground image and the background image are superimposed in the server to generate the game screen. Because the server has strong computing power, the rendering time can be saved, and the delay is reduced. The generated game screen is transmitted to the game client, and displayed by the game client, thereby improving the user experience.

In some embodiments, the method further includes: generating, when the target virtual character moves from the first position in the first region to a third position in the first region, a third game screen corresponding to the third position according to the first background image and a third foreground image, where the third foreground image is a foreground image corresponding to the third position; and transmitting the third game screen to the target client, where the target client is configured to display the third game screen.

Figure 6:
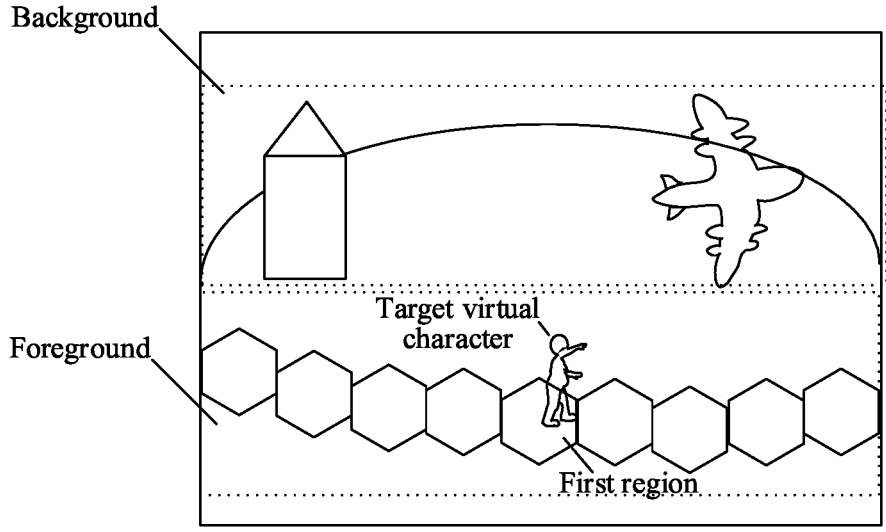
FIG. 6 is a schematic diagram 3 of a game screen according to an embodiment of the present invention.

In some embodiments, when moving on the game map, the target virtual character may be considered to be in individual "regions" obtained by dividing the game map. When the target virtual character is in one region, the target virtual character corresponds to one background image. The first position and the third position may be different positions in the first region. When the target virtual character moves in the same region, the background image is unchanged. FIG. 6 is a schematic diagram 3 of a game screen according to an embodiment of the present invention. The target virtual character moves from the first position in the first region shown in FIG. 3 to the third position shown in FIG. 6. Because the first position and the third position are in the same region, the background is unchanged. A foreground of the third position of the target virtual character may be rendered to obtain a third foreground image. The first background image cropped from the pre-rendered target background image and the third foreground image are superimposed to obtain a third game screen shown in FIG. 6. In this embodiment, the foreground image is rendered in the server, and the foreground image and the background image are superimposed in the server to generate the game screen. Because the server has strong computing power, the rendering time can be saved, and the delay is reduced. The generated game screen is transmitted to the game client, and displayed by the game client, thereby improving the user experience.

In some embodiments, the generating a third game screen corresponding to the third position according to the first background image and a third foreground image includes: performing deformation processing corresponding to the third position on the first background image to obtain a third background image; and rendering the third foreground image to obtain a rendered third foreground image, and superimposing the rendered third foreground image on the third background image to obtain the third game screen.

In some embodiments, the background seen in the same region of a grand map scene is the same, and if the background is totally unchanged, it seems unnatural. Each pixel in the background image from a current viewing angle may be deformed, and a final image can well reflect the change of a background field of view caused by a movement of a player. In this embodiment, the deformation processing may be enlarging or reducing the background image. A pixel value of each pixel point in the background image may further be processed, for example, the pixel value is increased or a preset value is decreased, and the preset value may be determined according to an actual situation. Alternatively, values of adjacent pixels are averaged.

Figure 7:
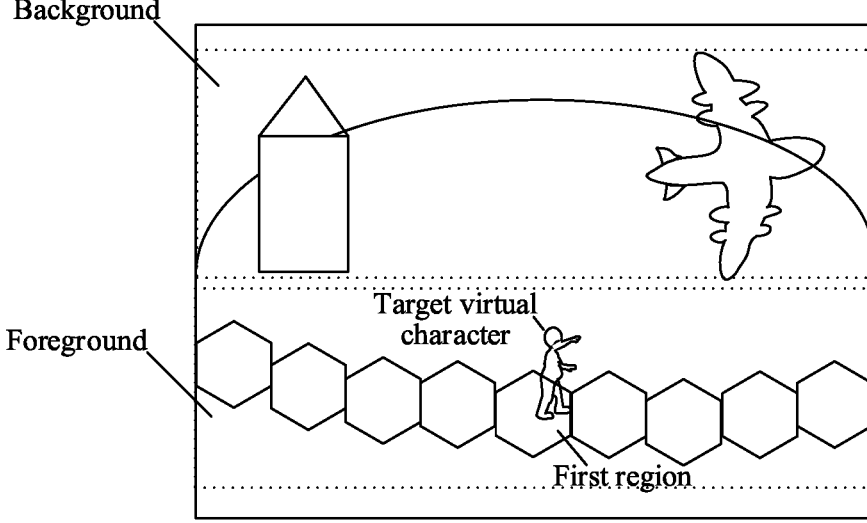
FIG. 7 is a schematic diagram 4 of a game screen according to an embodiment of the present invention.

In some embodiments, using an example in which the target virtual character shown in FIG. 3 is located at the first position in the first region, the target virtual character moves to the third position in the first region. Because the first position and the third position are in the same region, the background image is unchanged. The first background image corresponding to the first region is cropped from the pre-rendered target background image, and deformation processing is performed on pixels of the first background image to obtain a third background image. A foreground of the third position of the target virtual character is rendered to obtain a third foreground image, and the third foreground image and the third background image are superimposed to obtain a third game screen shown in FIG. 7. Comparing the game interface shown in FIG. 3 with the game interface shown in FIG. 7, the target virtual character moves from the first position in the first region to the third position in the first region in the foreground. Among the background images, the background image in FIG. 3 may be the first background image that is cropped from the pre-rendered target background image and corresponds to the first region, and the background image in FIG. 7 is obtained by performing deformation processing on the background image that is cropped from the target background image and corresponds to the first region.

In some embodiments, a deformation model may be generated through machine learning, and the deformation model may be a neural network model. Training samples may be used to train the neural network model to obtain the deformation model. The training samples may include: an original image and a deformed image. The first background image that is cropped from the target background image and corresponds to the first region is inputted to the deformation model to obtain a third background image outputted by the deformation model, and the third background image is a background image after the first background image is deformed. A foreground of the third position of the target virtual character is rendered to obtain a third foreground image, and the third foreground image and the third background image are superimposed to obtain a third game screen shown in FIG. 7. Comparing the game interface shown in FIG. 3 with the game interface shown in FIG. 7, the target virtual character moves from the first position in the first region to the third position in the first region in the foreground. Among the background images, the background image in FIG. 3 may be the first background image that is cropped from the pre-rendered target background image and corresponds to the first region, and the background image in FIG. 7 is obtained by performing deformation processing on the background image that is cropped from the target background image and corresponds to the first region.

In the foregoing embodiment, there is no need to re-render the background images at different positions in the same region, and a background change can be well reflected through simple deformation processing.

In some embodiments, the performing deformation processing corresponding to the third position on the first background image to obtain a third background image includes: adjusting pixel values of some pixel points or all pixel points in the first background image to obtain the third background image.

In some embodiments, the background seen in the same region of a grand map scene is the same, and if the background is totally unchanged, it seems unnatural. Each pixel in the background image from a current viewing angle may be deformed, and a final image can well reflect the change of a background field of view caused by a movement of a player. In this embodiment, the deformation processing may be enlarging or reducing the background image. Pixel values of all or some pixel points in the background image may further be processed, for example, the pixel values of some pixel points are increased or a preset value is decreased, and the preset value may be determined according to an actual situation. Alternatively, values of some adjacent pixels are averaged.

In some embodiments, a deformation model may be generated through machine learning, and the deformation model may be a neural network model. Training samples may be used to train the neural network model to obtain the deformation model. The training samples may include: an original image and a deformed image. The first background image that is cropped from the target background image and corresponds to the first region is inputted to the deformation model to obtain a third background image outputted by the deformation model, and the third background image is a background image after the first background image is deformed. The deformation model may process pixel values of some or all pixel points in the first background image.

In the foregoing embodiment, there is no need to re-render the background images at different positions in the same region, and a background change can be well reflected through simple deformation processing.

In some embodiments, the generating a first game screen corresponding to the first position according to the first background image and a first foreground image includes: rendering the first foreground image to obtain a rendered first foreground image, and superimposing the rendered first foreground image on the first background image to obtain the first game screen; or performing scaling processing on the first background image to obtain a fourth background image; and rendering the first foreground image to obtain a rendered first foreground image, and superimposing the rendered first foreground image on the fourth background image to obtain the first game screen.

In some embodiments, during cropping a first background image corresponding to a first region or during acquiring a first background image, the first foreground image is rendered, and a rendered first foreground image and a cropped first background image are superimposed to obtain the first game screen.

In some embodiments, to meet the adaptability of user devices with different screen sizes, the first background image may be enlarged or reduced, and the scaling processing includes enlarging and reducing. For example, a display screen on a PC side of a computer is usually larger than a display screen on a mobile phone side. To meet the adaptability of different display screen sizes between the PC side and the mobile phone side, scaling processing may be performed on a pre-rendered first background image. For a PC side with a larger screen, the first background image may be enlarged, and for a mobile phone side with a smaller screen, the first background image may be reduced. After the first foreground image is rendered, a fourth background image obtained by scaling processing and the first foreground image are superimposed to obtain the first game screen. In this embodiment, scaling processing is performed on the pre-rendered first background image, which can better adapt to terminal devices with different display screens, thereby ensuring the image quality of game screens in different terminal devices.

In some embodiments, the acquiring a first background image that is cropped from a pre-rendered background image and corresponds to the first position includes: acquiring the first background image cropped from the pre-rendered background image from a cache server, where the cache server is configured to store the pre-rendered background image.

In some examples, the cache server may be the cache cloud. During game rendering, index parameters may be transmitted to the cache cloud according to a position (coordinates) where the target virtual character is located in the game map and a viewing angle of the camera. According to the index parameters, the cache cloud crops a game background image corresponding to the region where the target virtual character is currently located from the pre-rendered target background image to obtain the first background image.

In some examples, the cache cloud may further determine a relative position of the target virtual character in the first region according to the current position of the target virtual character. According to the relative position of the target virtual character in the first region, the cropped first background image stretched and deformed to some extent to obtain a third background image, to ensure the authenticity of the background images at different positions in the same region.

Figures 8, 9:
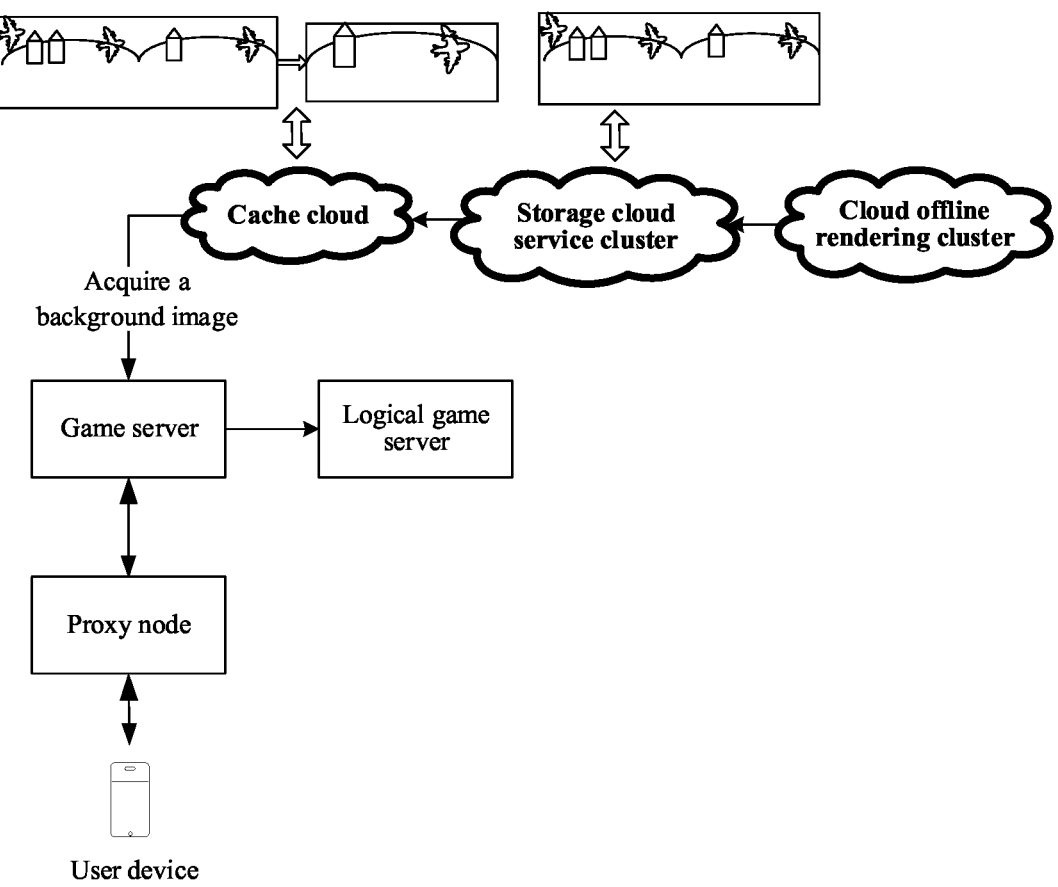
FIG. 8 is a schematic diagram of an overall architecture according to an embodiment of the present invention.
FIG. 9 is a schematic diagram of rendering a background image of a game according to an embodiment of the present invention.

FIG. 8 is a schematic diagram of an overall architecture according to an embodiment of the present invention. As an original material, a high-definition game background in the game map may be pre-rendered in an offline rendering cluster in the cloud to obtain a pre-rendered target background image. The offline rendering cluster may be a plurality of servers equipped with a central processing unit with strong computing power, and the servers may continuously render the original material of the game background into a picture or video in a high-definition game background format.

The rendered target background image is stored as a game resource in a corresponding storage cloud server cluster. The cache cloud loads the target background image in the storage cloud, and a target virtual background image may be stored according to a game scene, a position (for example, a coordinate position) of the target virtual character, and index information of a camera angle. The target background image may be stored in an internal memory or an SSD for the game server to request.

The user device is connected to a proxy node of a cloud game through a proximity access manner. The proxy node forwards an operation performed by the player to a cloud game server, and the player may control the target virtual character to move in the game scene by operating an input device such as a keyboard, a mouse, or a handle.

The proxy node may transmit an audio and video stream of the game generated by the game server to the user device. The game server may process game logics and game rendering, and finally encode the rendered images into a video stream, and the video stream is transmitted to the proxy node and then transmitted to the user device by the proxy node.

For a multiplayer game scene, a logical server for the multiplayer game scene that is responsible for synchronization and interaction of player states is provided. During game rendering, parameters are transmitted to the cache cloud according to the game scene, map coordinates of the player, and the viewing angle of the camera. The cache cloud crops a game background image (a first background image) corresponding to the current position of the target virtual character from the pre-rendered game background through indexing. The cache cloud may determine the relative position in the first region according to a current position of the player, and stretch and deform the first background image to ensure the authenticity.

The user device may directly display the game screen, such as the first game screen generated according to the first background image and the first foreground image. The user device may further render and fuse the foreground and the background, for example, superimpose the first background image and the first foreground image to obtain the first game screen and display the first game screen. Therefore, the delay brought by processing the game background by the cloud game server may be further shortened.

In some embodiments, the method further includes: rendering a background image of the game to obtain a pre-rendered background image; and transmitting the pre-rendered background image to the cache server.

In some examples, the background image of the game may be rendered by the cloud offline rendering cluster to obtain a pre-rendered target background image, and the cloud offline rendering cluster transmits the rendered target background image to the cache cloud.

FIG. 9 is a schematic diagram of rendering a background image of a game according to an embodiment of the present invention. As an original material, a high-definition game background in the game map may be pre-rendered in an offline rendering cluster in the cloud to obtain a pre-rendered target background image. The offline rendering cluster may be a plurality of servers equipped with a central processing unit with strong computing power, and the servers may continuously render the original material of the game background into a picture or video in a high-definition game background format.

The rendered target background image is stored as a game resource in a corresponding storage cloud server cluster. The cache cloud loads the target background image in the storage cloud, and a target virtual background image may be stored according to a game scene, a position (for example, a coordinate position) of the target virtual character, and index information of a camera angle. The target background image may be stored in an internal memory or an SSD for the game server to request.

In some embodiments, the acquiring a first background image that is cropped from a pre-rendered background image and corresponds to the first position includes: acquiring a first static background image that is cropped from the pre-rendered background image and corresponds to the first position, where the pre-rendered background image includes a pre-rendered static background image, or a pre-rendered dynamic background image; and acquiring a first dynamic background image that is cropped from the pre-rendered background image and corresponds to the first position, where the pre-rendered background image includes a pre-rendered dynamic background image.

In some examples, an image obtained by pre-rendering the game scene may be a static image or a dynamic image. According to a current position of the target virtual character, a target static image may be cropped to obtain a first static image corresponding to the first position. Alternatively, according to a current position of the target virtual character, a target dynamic image may be cropped to obtain a first dynamic image corresponding to the first position.

Figure 10:
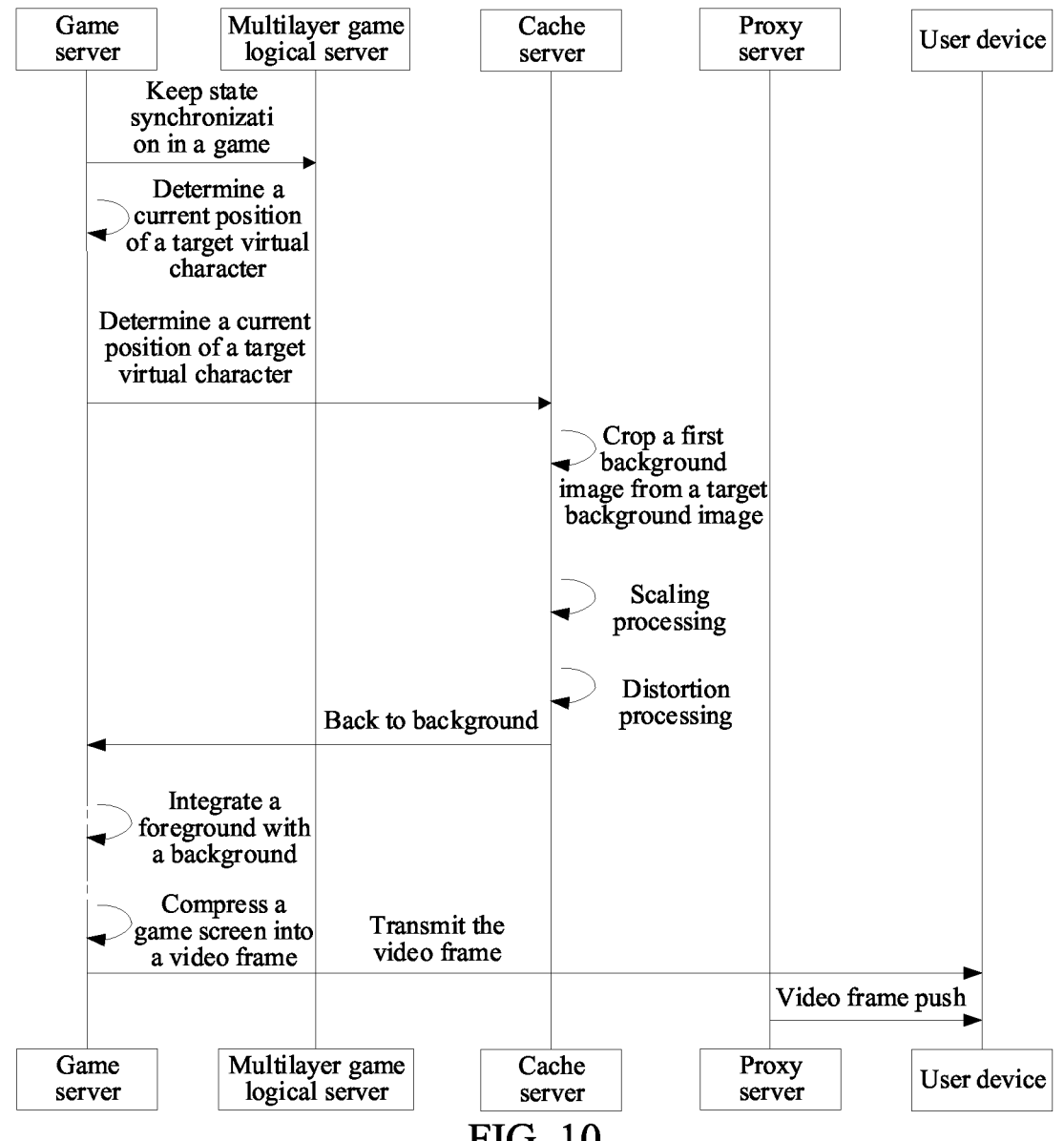
FIG. 10 is a schematic diagram of information exchange according to an embodiment of the present invention.

FIG. 10 is a schematic diagram of information exchange according to an embodiment of the present invention. A game server and a cache server are similar to a C/S structure. The cache cloud loads the target background image in the storage cloud, and a target virtual background image may be stored according to a game scene, a position (for example, a coordinate position) of the target virtual character, and index information of a camera angle. The target background image may be stored in an internal memory or an SSD for the game server to request.

The game server transmits a current first position of the target virtual character and a viewing angle of a camera to the cache server. The cache cloud crops the target background image to obtain a first background image corresponding to the current first position of the target virtual character. The Cache cloud performs scaling processing on the first background image and performs distortion processing of a certain viewing angle. The cache cloud transmits a cropped first background image, or a scaled background image, or a distorted background image, or a scaled and distorted background image to the game server. The game server superimposes the foreground image and the background image to obtain the game screen, and compresses a game replacement into a video frame. The game server transmits the video frame to a proxy server, the proxy server transmits the video frame to the user device, and the game screen is displayed in the user device. For a multiplayer game scene, a logical server for the multiplayer game scene that is responsible for synchronization and interaction of player states is provided.

For ease of description, the foregoing method embodiments are described as a series of action combinations. However, a person skilled in the art should learn that the present invention is not limited to the described sequence of the actions, because some steps may be performed in another sequence or performed at the same time according to the present invention. In addition, a person skilled in the art is also to learn that the embodiments described in this specification are all exemplary embodiments, and the involved actions and modules are not necessarily required to the present invention.

Figure 11:
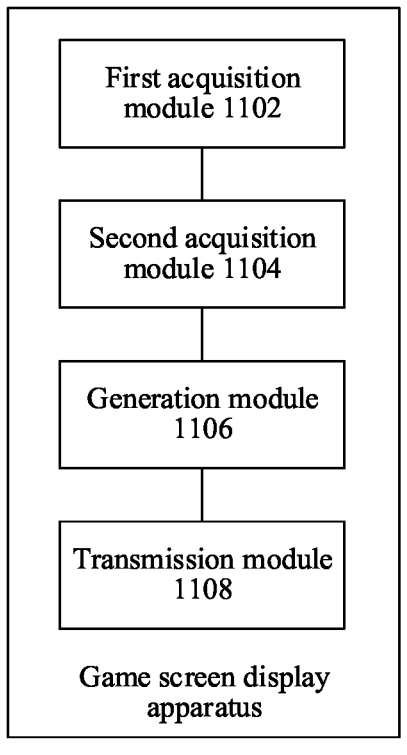
FIG. 11 is a schematic structural diagram of a game screen display apparatus according to an embodiment of the present invention.

An embodiment of the present invention further provides a game screen display apparatus for implementing the foregoing game screen display method. As shown in FIG. 11, the apparatus includes: a first acquisition module 1102, configured to acquire a current first position of a target virtual character in a game; a second acquisition module 1104, configured to acquire a first background image that is cropped from a pre-rendered background image and corresponds to the first position; a generation module 1106, configured to generate a first game screen corresponding to the first position according to the first background image and a first foreground image, the first foreground image being a foreground image corresponding to the first position; and a transmission module 1108, configured to transmit the first game screen to a target client, the target client being configured to display the first game screen.

In some embodiments, the second acquisition module is configured to acquire, when it is determined that the first position is in a first region of a game map of the game, the first background image that is cropped from the pre-rendered background image and corresponds to the first region, where the game map includes a set of regions, and each of the set of regions corresponds to one background image cropped from the pre-rendered background image.

In some embodiments, the second acquisition module is further configured to acquire, when the target virtual character moves from the first position in the first region to a second position in a second region, a second background image that is cropped from the pre-rendered target background image and corresponds to the second region; and the generation module is further configured to generate a second game screen corresponding to the second position according to the second background image and a second foreground image, where the second foreground image is a foreground image corresponding to the second position; and transmit the second game screen to the target client, where the target client is configured to display the second game screen.

In some embodiments, the generation module is further configured to generate, when the target virtual character moves from the first position in the first region to a third position in the first region, a third game screen corresponding to the third position according to the first background image and a third foreground image, where the third foreground image is a foreground image corresponding to the third position; and transmit the third game screen to the target client, where the target client is configured to display the third game screen.

In some embodiments, the second acquisition module is configured to perform deformation processing corresponding to the third position on the first background image to obtain a third background image; and render the third foreground image to obtain a rendered third foreground image, and superimpose the rendered third foreground image on the third background image to obtain the third game screen.

In some embodiments, the apparatus is further configured to adjust pixel values of some pixel points or all pixel points in the first background image to obtain the third background image.

In some embodiments, the apparatus is further configured to render the first foreground image to obtain a rendered first foreground image, and superimpose the rendered first foreground image on the first background image to obtain the first game screen; perform scaling processing on the first background image to obtain a fourth background image; and render the first foreground image to obtain a rendered first foreground image, and superimpose the rendered first foreground image on the fourth background image to obtain the first game screen.

In some embodiments, the apparatus is further configured to acquire the first background image cropped from the pre-rendered background image from a cache server, where the cache server is configured to store the pre-rendered background image.

In some embodiments, the apparatus is further configured to render a background image of the game to obtain a pre-rendered background image; and transmit the pre-rendered background image to the cache server.

In some embodiments, the apparatus is further configured to acquire a first static background image that is cropped from the pre-rendered background image and corresponds to the first position, where the pre-rendered background image includes a pre-rendered static background image, or a pre-rendered dynamic background image; and acquire a first dynamic background image that is cropped from the pre-rendered background image and corresponds to the first position; where the pre-rendered background image includes a pre-rendered dynamic background image.

Figure 12:
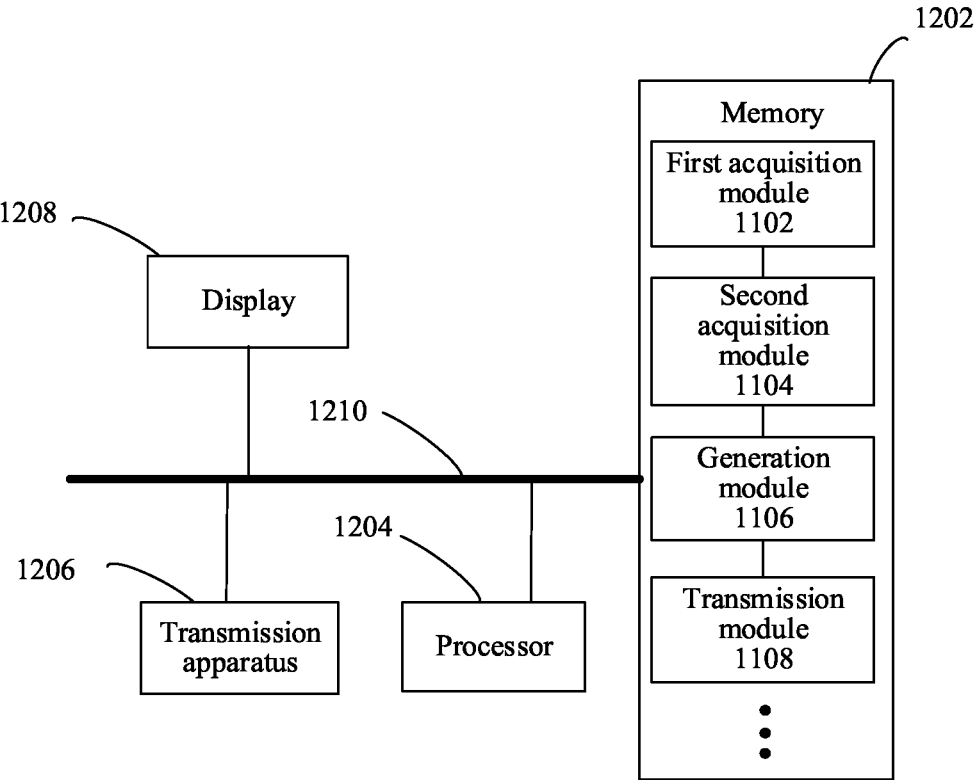
FIG. 12 is a schematic structural diagram of an electronic device according to an embodiment of the present invention.

According to another aspect of the embodiments of the present invention, an electronic device for implementing the foregoing game screen display method is further provided. The electronic device may be the terminal device or the server shown in FIG. 1. In this embodiment, an example in which the electronic device is the server is used for description. As shown in FIG. 12, the electronic device includes a memory 1202 and a processor 1204. The memory 1202 stores a computer program. The processor 1204 is configured to perform the steps in any one of the foregoing method embodiments by executing the computer program.

In some embodiments, the electronic device may be located in at least one of a plurality of network devices in a computer network.

In some embodiments, the processor may be configured to perform the following steps through the computer program:

S1. Acquire a current first position of a target virtual character in a game.

S2. Acquire a first background image that is cropped from a pre-rendered background image and corresponds to the first position.

S3. Generate a first game screen corresponding to the first position according to the first background image and a first foreground image, the first foreground image being a foreground image corresponding to the first position.

S4. Transmit the first game screen to a target client, the target client being configured to display the first game screen.

In some embodiments, a person of ordinary skill in the art may understand that, the structure shown in FIG. 12 is only illustrative. The electronic device may be a terminal device such as a smartphone (for example, an Android phone or an iOS phone), a tablet computer, a palmtop computer, an MID, or a PAD. FIG. 12 does not limit the structure of the electronic device. For example, the electronic device may further include more or fewer components (such as a network interface) than those shown in FIG. 12, or have a configuration different from that shown in FIG. 12.

The memory 1202 may be configured to store a software program and module, for example, a program instruction/module corresponding to the game screen display method and apparatus in the embodiments of the present invention, and the processor 1204 runs the software program and module stored in the memory 1202, to perform various function applications and data processing, that is, implement the foregoing game screen display method. The memory 1202 may include a high-speed RAM, and may further include a non-volatile memory such as one or more magnetic storage apparatuses, a flash memory, or another non-volatile solid-state memory. In some embodiments, the memory 1202 may further include memories remotely disposed relative to the processor 1204, and these remote memories may be connected to the terminal through a network. The foregoing examples of the network include, but are not limited to, the Internet, an intranet, a local area network, a mobile communication network, and a combination thereof. The memory 1202 may specifically be configured to store, but not limited to, information such as sample feature of an object and a target virtual resource account. As an example, as shown in FIG. 12, the memory 1202 may include, but is not limited to, the first obtaining module 1102, the second obtaining module 1104, the generation module 1106, and the transmission module 1108 in the foregoing game screen display apparatus. In addition, the memory 1202 may further include, but not limited to, other modules and units in the foregoing game screen display apparatus, and details are not described herein again.

In some embodiments, the transmission apparatus 1206 is configured to receive or transmit data through a network. Specific examples of the network include a wired network and a wireless network. In an example, the transmission apparatus 1206 includes a network interface controller (NIC). The NIC may be connected to another network device and a router by using a network cable, to communicate with the Internet or a local area network. In an example, the transmission apparatus 1206 is a radio frequency (RF) module, and is configured to wirelessly communicate with the Internet.

In addition, the electronic device further includes: a display 1208, configured to display the first game screen; and a connection bus 1210, configured to connect various module components in the electronic device.

In other embodiments, the terminal device or server may be a node in a distributed system. The distributed system may be a blockchain system. The blockchain system may be a distributed system formed by a plurality of nodes connected in the form of network communication. A peer to peer (P2P) network may be formed between the nodes. A computing device in any form, for example, an electronic device such as a server or a terminal, may become a node in the blockchain system by joining the P2P network.

According to an aspect of this application, a computer program product or a computer program is provided, the computer program product or the computer program including computer instructions, and the computer instructions being stored in a computer-readable storage medium. A processor of a computer device reads the computer instructions from the computer-readable storage medium, and executes the computer instructions, so that the computer device performs the method provided in the various implementations. The computer program is configured to perform steps in any one of the foregoing method embodiments.

In some embodiments, the computer-readable storage medium may be configured to store a computer program for performing the following steps:

S1. Acquire a current first position of a target virtual character in a game.

S2. Acquire a first background image that is cropped from a pre-rendered background image and corresponds to the first position.

S3. Generate a first game screen corresponding to the first position according to the first background image and a first foreground image, the first foreground image being a foreground image corresponding to the first position.

S4. Transmit the first game screen to a target client, the target client being configured to display the first game screen.

In some embodiments, a person of ordinary skill in the art may understand that all or some of the steps of the methods in the foregoing embodiments may be implemented by a program instructing related hardware of the terminal device. The program may be stored in a computer-readable storage medium. The storage medium may include a flash disk, a read-only memory (ROM), a random-access memory (RAM), a magnetic disk, an optical disk, and the like.

The sequence numbers of the foregoing embodiments of the present invention are merely for description purpose, and do not indicate the preference among the embodiments.

When the integrated unit in the foregoing embodiments is implemented in the form of a software function unit and sold or used as an independent product, the integrated unit may be stored in the foregoing computer-readable storage medium. Based on such an understanding, the technical solutions of the present invention essentially, or the part contributing to the related technology, or all or some of the technical solutions may be represented in a form of a software product. The computer software product is stored in a storage medium and comprises several instructions for instructing one or more computer devices (which may be a personal computer, a server, or a network device) to perform all or some of the steps of the method in the embodiments of the present invention.

In the foregoing embodiments of the present invention, the descriptions of the embodiments have respective focuses. For a part that is not described in detail in an embodiment, reference may be made to related descriptions in other embodiments.

In the several embodiments provided in this application, it is to be understood that the disclosed client may be implemented in other manners. The described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or another form.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of embodiments.

In addition, functional units in the embodiments of this application may be integrated into one processing unit, each of the units may exist alone physically, or two or more units are integrated into one unit. The integrated unit may be implemented in a form of hardware, or may be implemented in a form of a software functional unit.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely some implementations of the present invention. It should be noted that a person of ordinary skill in the art may make several improvements or refinements without departing from the principle of the present invention and the improvements or refinements shall fall within the protection scope of the present invention.

What is claimed is:

1. A game screen display method performed by a computing device, the method comprising:

acquiring a current first position of a target virtual character in a game;

acquiring a first background image from a pre-rendered background image that corresponds to the first position and a first foreground image that corresponds to the first position, respectively, wherein:

the pre-rendered background image is obtained by pre-rendering target background images corresponding to all regions on a game map; and acquiring the first background image from the pre-rendered background image that corresponds to the first position includes cropping the pre-rendered background image based on the first position;

generating a first game screen corresponding to the first position according to the first background image and the first foreground image; and causing a display of the first game screen by a target client of the game.

2. The method according to claim 1, wherein the game is associated with a game map including a set of regions, each region corresponding to a respective portion of the pre-rendered background image and the first position being within one of the set of regions.

3. The method according to claim 1, wherein the method further comprises:

when the target virtual character moves from the first position to a second position, acquiring a second foreground image corresponding to the second position and generating a second game screen corresponding to the second position according to the first background image and the second foreground image; and transmitting the second game screen to the target client, wherein the target client is configured to display the second game screen.

4. The method according to claim 3, wherein the generating a second game screen corresponding to the second position according to the first background image and the second foreground image comprises:

performing deformation processing on the first background image according to the second position to obtain a second background image; and superimposing the second foreground image on the second background image to obtain the second game screen.

5. The method according to claim 4, wherein the performing deformation processing on the first background image according to the second position to obtain a second background image comprises:

adjusting pixel values of the first background image to obtain the second background image.

6. The method according to claim 1, wherein the generating a first game screen corresponding to the first position according to the first background image and the first foreground image comprises:

superimposing the first foreground image on the first background image to obtain the first game screen; or performing scaling processing on the first background image to obtain a scaled background image and superimposing the first foreground image on the scaled background image to obtain the first game screen.

7. The method according to claim 1, wherein the first foreground image is rendered in real time.

8. The method according to claim 1, wherein the causing a display of the first game screen by a target client of the game further comprises:

transmitting the first game screen to the target client of the game at a terminal device, the target client being configured to display the first game screen when playing the game.

9. The method according to claim 1, wherein the acquiring a first background image from a pre-rendered background image that corresponds to the first position comprises:

cropping a first static background image from the pre-rendered background image that corresponds to the first position, wherein the pre-rendered background image comprises a pre-rendered static background image or a pre-rendered dynamic background image; or cropping a first dynamic background image from the pre-rendered background image that corresponds to the first position, wherein the pre-rendered background image comprises a pre-rendered dynamic background image.

10. A computing device, comprising a memory and a processor, the memory storing a computer program that, when executed by the processor, causes the computing device to perform a game screen display method, the method including:

acquiring a current first position of a target virtual character in a game;

acquiring a first background image from a pre-rendered background image that corresponds to the first position and a first foreground image that corresponds to the first position, respectively, wherein:

the pre-rendered background image is obtained by pre-rendering target background images corresponding to all regions on a game map; and acquiring the first background image from the pre-rendered background image that corresponds to the first position includes cropping the pre-rendered background image based on the first position;

generating a first game screen corresponding to the first position according to the first background image and the first foreground image; and transmitting the first game screen to a target client of the game at a terminal device, the target client being configured to display the first game screen when playing the game.

11. The computing device according to claim 10, wherein the game is associated with a game map including a set of regions, each region corresponding to a respective portion of the pre-rendered background image and the first position being within one of the set of regions.

12. The computing device according to claim 10, wherein the method further comprises:

when the target virtual character moves from the first position to a second position, acquiring a second foreground image corresponding to the second position and generating a second game screen corresponding to the second position according to the first background image and the second foreground image; and transmitting the second game screen to the target client, wherein the target client is configured to display the second game screen.

13. The computing device according to claim 12, wherein the generating a second game screen corresponding to the second position according to the first background image and the second foreground image comprises:

performing deformation processing on the first background image according to the second position to obtain a second background image; and superimposing the second foreground image on the second background image to obtain the second game screen.

14. The computing device according to claim 13, wherein the performing deformation processing on the first background image according to the second position to obtain a second background image comprises:

adjusting pixel values of the first background image to obtain the second background image.

15. The computing device according to claim 10, wherein the generating a first game screen corresponding to the first position according to the first background image and the first foreground image comprises:

superimposing the first foreground image on the first background image to obtain the first game screen; or performing scaling processing on the first background image to obtain a scaled background image and superimposing the first foreground image on the scaled background image to obtain the first game screen.

16. The computing device according to claim 10, wherein the acquiring a first background image from a pre-rendered background image that corresponds to the first position comprises:

cropping a first static background image from the pre-rendered background image that corresponds to the first position, wherein the pre-rendered background image comprises a pre-rendered static background image or a pre-rendered dynamic background image; or cropping a first dynamic background image from the pre-rendered background image that corresponds to the first position, wherein the pre-rendered background image comprises a pre-rendered dynamic background image.

17. A non-transitory computer-readable storage medium, storing a computer program that, when executed by a processor of a computing device, causes the computing device to perform a game screen display method, the method including:

acquiring a current first position of a target virtual character in a game;

acquiring a first background image from a pre-rendered background image that corresponds to the first position and a first foreground image that corresponds to the first position, respectively, wherein:

the pre-rendered background image is obtained by pre-rendering target background images corresponding to all regions on a game map; and acquiring the first background image from the pre-rendered background image that corresponds to the first position includes cropping the pre-rendered background image based on the first position;

generating a first game screen corresponding to the first position according to the first background image and the first foreground image; and transmitting the first game screen to a target client of the game at a terminal device, the target client being configured to display the first game screen when playing the game.

18. The non-transitory computer-readable storage medium according to claim 17, wherein the method further comprises:

when the target virtual character moves from the first position to a second position, acquiring a second foreground image corresponding to the second position and generating a second game screen corresponding to the second position according to the first background image and the second foreground image; and transmitting the second game screen to the target client, wherein the target client is configured to display the second game screen.

19. The non-transitory computer-readable storage medium according to claim 18, wherein the generating a second game screen corresponding to the second position according to the first background image and the second foreground image comprises:

performing deformation processing on the first background image according to the second position to obtain a second background image; and superimposing the second foreground image on the second background image to obtain the second game screen.

20. The non-transitory computer-readable storage medium according to claim 17, wherein the generating a first game screen corresponding to the first position according to the first background image and the first foreground image comprises:

superimposing the first foreground image on the first background image to obtain the first game screen; or performing scaling processing on the first background image to obtain a scaled background image and superimposing the first foreground image on the scaled background image to obtain the first game screen.

\* \* \* \* \*